US012656948B2

(12) United States Patent
Morgan et al.

(10) Patent No.: US 12,656,948 B2
(45) Date of Patent: *Jun. 16, 2026

(54) PROGRAMMING-IN-PROCESS FLAG FOR FUSE ELEMENTS

(71) Applicant: Micron Technology, Inc., Boise, ID (US)

(72) Inventors: Donald Martin Morgan, Meridian, ID (US); Alan J. Wilson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,737

(22) Filed: Sep. 23, 2024

(65) Prior Publication Data

US 2025/0094043 A1      Mar. 20, 2025

Related U.S. Application Data

(60) Continuation of application No. 18/100,803, filed on Jan. 24, 2023, now Pat. No. 12,118,211, which is a
(Continued)

(51) Int. Cl.
*G06F 3/06* (2006.01)

(52) U.S. Cl.
CPC .......... *G06F 3/0604* (2013.01); *G06F 3/0644* (2013.01); *G06F 3/0679* (2013.01)

(58) Field of Classification Search
CPC .... G06F 3/0604; G06F 3/0644; G06F 3/0679; G06F 12/0246; G06F 2212/7202; G06F 2212/7209
See application file for complete search history.

(56) References Cited

U.S. PATENT DOCUMENTS 9,418,700 B2      8/2016   Ramanujan et al.
10,254,981 B2     4/2019   Tomic et al.
(Continued)

FOREIGN PATENT DOCUMENTS

CN      101405813 A      4/2009
CN      105340020 A      2/2016
(Continued)

OTHER PUBLICATIONS

"International Search Report and Written Opinion of the International Searching Authority," issued in connection with Int'l Appl. No. PCT/US21/72337, dated Feb. 18, 2022 (9 pages).
(Continued)

*Primary Examiner* — Jane W Benner
(74) *Attorney, Agent, or Firm* — Holland & Hart LLP

(57) ABSTRACT

Methods, systems, and devices for retiring pages of a memory device are described. An ordered set of device information pages may be used to store device information. The device information pages may be in non-volatile memory. Each page may include a counter value of the number of accesses to indicate if the page includes valid data. A flag associated with the page may be set when the counter value reaches a threshold, to retire the page. Upon power-up, the device may determine which page to use, based on the flags. The flag may be stored in the page, or may be separate (e.g., fuse elements). If fuse elements are used, the page may store a programming-in-process flag to indicate when programming of the fuse element may not have been completed before power loss, in which case the programming may be restarted after power is restored.

20 Claims, 9 Drawing Sheets

Related U.S. Application Data division of application No. 17/105,000, filed on Nov. 25, 2020, now Pat. No. 11,579,772.

(56)                 References Cited

U.S. PATENT DOCUMENTS

| | | | |
|---|---|---|---|
| 2004/0085119 A1* | 5/2004 | Hokenmaier | G11C 17/18 |
| | | | 257/E21.595 |
| 2007/0297226 A1 | 12/2007 | Mokhlesi | |
| 2009/0013148 A1 | 1/2009 | Eggleston | |
| 2015/0026386 A1 | 1/2015 | Wakchaure et al. | |
| 2015/0143052 A1 | 5/2015 | Ackaret et al. | |
| 2015/0143054 A1 | 5/2015 | Ackaret et al. | |
| 2015/0154061 A1 | 6/2015 | Camp et al. | |
| 2016/0041760 A1 | 2/2016 | Kuang et al. | |
| 2017/0160960 A1 | 6/2017 | Camp et al. | |
| 2018/0366209 A1 | 12/2018 | Mehta et al. | |
| 2019/0278914 A1* | 9/2019 | Le Roy | G06F 21/575 |
| 2019/0294368 A1 | 9/2019 | Hiraishi | |
| 2020/0034269 A1 | 1/2020 | Ganesan et al. | |
| 2020/0210272 A1 | 7/2020 | Zhang et al. | |
| 2020/0218467 A1 | 7/2020 | Brandt et al. | |
| 2020/0409787 A1 | 12/2020 | Yip et al. | |

FOREIGN PATENT DOCUMENTS

| | | |
|---|---|---|
| CN | 109144407 A | 1/2019 |
| KR | 10-2016-0087799 A | 7/2016 |
| TW | I570560 B | 2/2017 |

OTHER PUBLICATIONS

Chinese patent office, "China Office Action," issued in connection with China Patent Application No. 202180079408.0 dated Feb. 6, 2024 (9 pages) (2 pages of English Translation and 7 pages of Original Document).

Taiwanese Patent Office, "Office Action and Search Report", issued in connection with Taiwanese Patent Application No. 110141964 dated Apr. 26, 2022 (6 pages).

Chinese patent office, "China Office Action," issued in connection with China Patent Application No. 202411105702.6 1 dated Mar. 7, 2025 (7 pages) (2 pages of English Translation and 5 pages of Original Document).

* cited by examiner

Memory System 210

Memory System Controller 215

Buffer Queue — 265

Bus 235

Host System 205

Interface 220

Cmd Queue

260

Buffer 225

250

250

Storage Controller 230

Storage Queue

270

Memory Devices 240

200

| Selector Reading Component | Page Determination Component |
|---|---|
| 710 | 715 |
| Selector Updating Component | Data Reader/writer |
| 720 | 725 |
| Counter Controller | Command Receiver |
| 730 | 735 |
| Flag Controller | Fuse Programming Component |
| 740 | 745 |

705

700

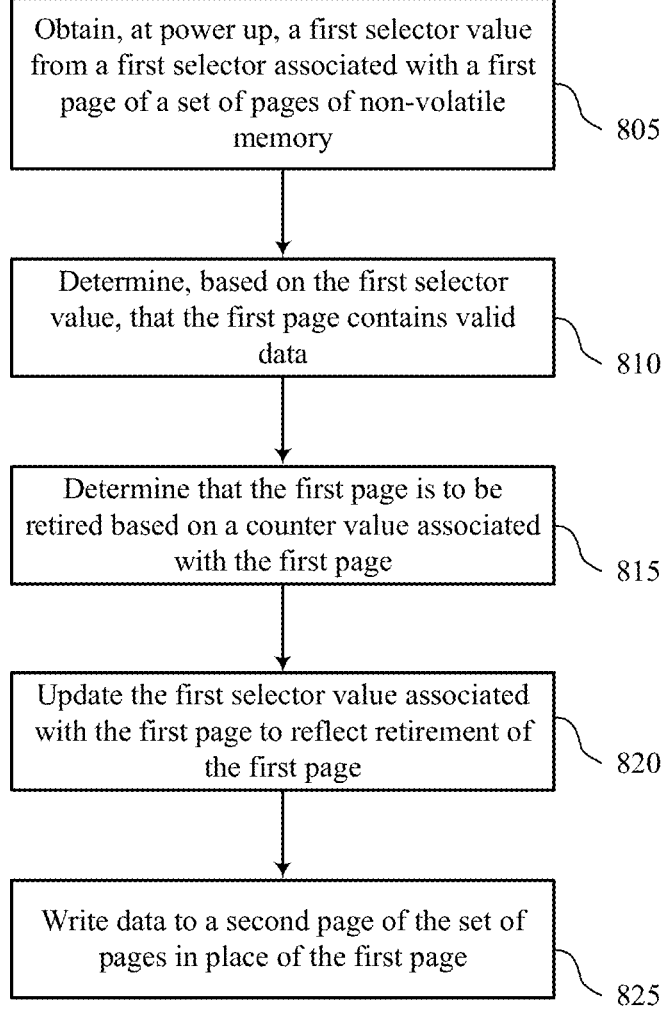

Obtain, at power up, a first selector value from a first selector associated with a first page of a set of pages of non-volatile memory

805

Determine, based on the first selector value, that the first page contains valid data

810

Determine that the first page is to be retired based on a counter value associated with the first page

815

Update the first selector value associated with the first page to reflect retirement of the first page

820

Write data to a second page of the set of pages in place of the first page

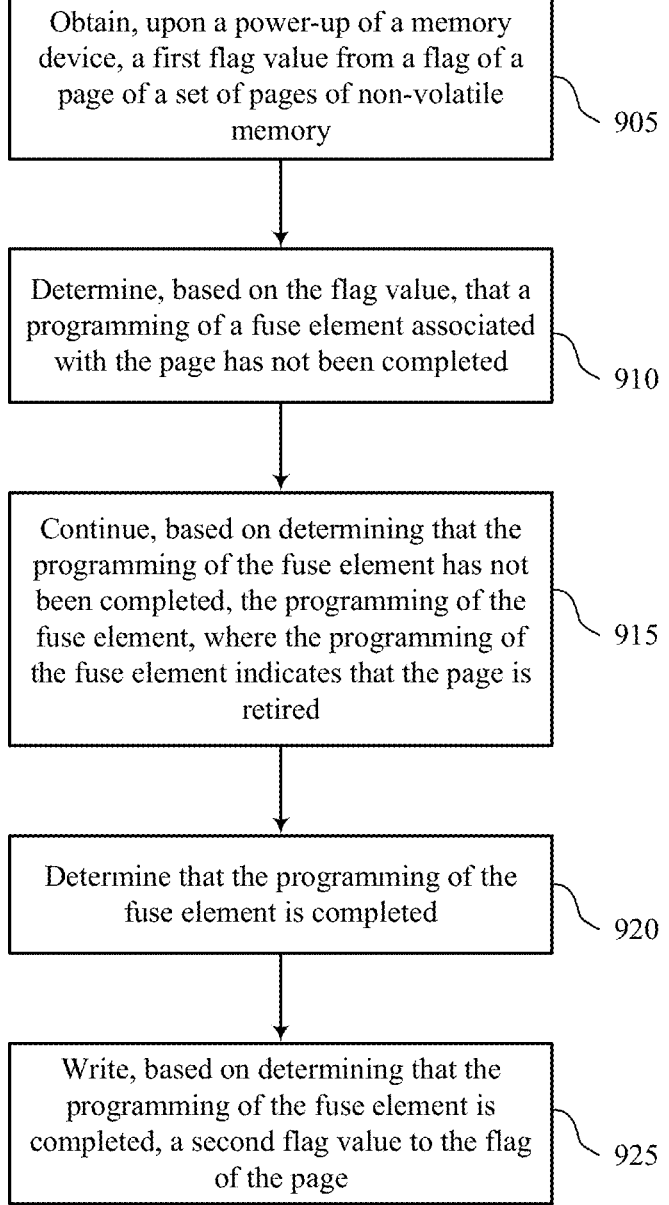

Obtain, upon a power-up of a memory device, a first flag value from a flag of a page of a set of pages of non-volatile memory ⟋ 905

Determine, based on the flag value, that a programming of a fuse element associated with the page has not been completed ⟍ 910

Continue, based on determining that the programming of the fuse element has not been completed, the programming of the fuse element, where the programming of the fuse element indicates that the page is retired ⟋ 915

Determine that the programming of the fuse element is completed ⟍ 920

Write, based on determining that the programming of the fuse element is completed, a second flag value to the flag of the page ⟍ 925

PROGRAMMING-IN-PROCESS FLAG FOR FUSE ELEMENTS

CROSS REFERENCE

The present Application for Patent is a continuation of U.S. patent application Ser. No. 18/100,803 by Morgan et al., entitled "MANAGING PAGE RETIREMENT FOR NON-VOLATILE MEMORY," filed Jan. 24, 2023, which is a divisional of U.S. patent application Ser. No. 17/105,000 by Morgan et al., entitled "MANAGING PAGE RETIRE- MENT FOR NON-VOLATILE MEMORY," filed Nov. 25, 2020, each of which is assigned to the assignee hereof, and each of which is expressly incorporated by reference in its entirety herein.

FIELD OF TECHNOLOGY

The following relates generally to one or more systems for memory and more specifically to methods for retiring pages of a memory device.

BACKGROUND

Memory devices are widely used to store information in various electronic devices such as computers, wireless com- munication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corre- sponding states.

Various types of memory devices exist, including mag- netic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIGS. 8 and 9 show flowcharts illustrating methods that support methods for retiring pages of a memory device in accordance with examples as disclosed herein.

DETAILED DESCRIPTION

For memory and other devices, device information such as configuration, status, or security information may be stored in non-volatile memory cells, so the information is not lost when power is removed from the device. For example, knowledge of the last power cycle may be used to scramble or otherwise obscure data for security. The non- volatile cells may be main memory cells in the case of a non-volatile memory device or may be non-volatile memory included on a different type of device. While non-volatile memory may be good for storing device information, non- volatile memory generally has a limited number of access cycles before its reliability deteriorates. So the non-volatile memory cells that hold the device information should be retired before integrity of the information is lost.

According to various aspects described herein, an ordered set of device information pages may be used to store the device information. The device information pages may be in non-volatile memory. Each page may include a counter value of the number of accesses to track usage of the page relative to a reliability limit. A flag associated with the page may be set when the counter value reaches a threshold, to retire the page. Upon power-up, the device may determine which page to use, based on the flags. The flag may be stored in the page, or may be separate (e.g., fuse elements). If fuse elements are used, a page may store a programming-in- process flag to indicate when programming of the fuse element may not have been completed before power loss, in which case the programming may be restarted after power is restored. As used herein, a fuse element may refer to a fuse (e.g., higher resistance after programming), or an anti-fuse (e.g., lower resistance after programming), for example by way of logic inversion.

Features of the disclosure are initially described in the context of systems, devices, and circuits as described with reference to FIGS. 1 through 3. These and other features of the disclosure are further illustrated by and described with reference to an apparatus diagram and flowcharts that relate to methods for retiring pages of a memory device as described with reference to FIGS. 4-9.

Figure 1:
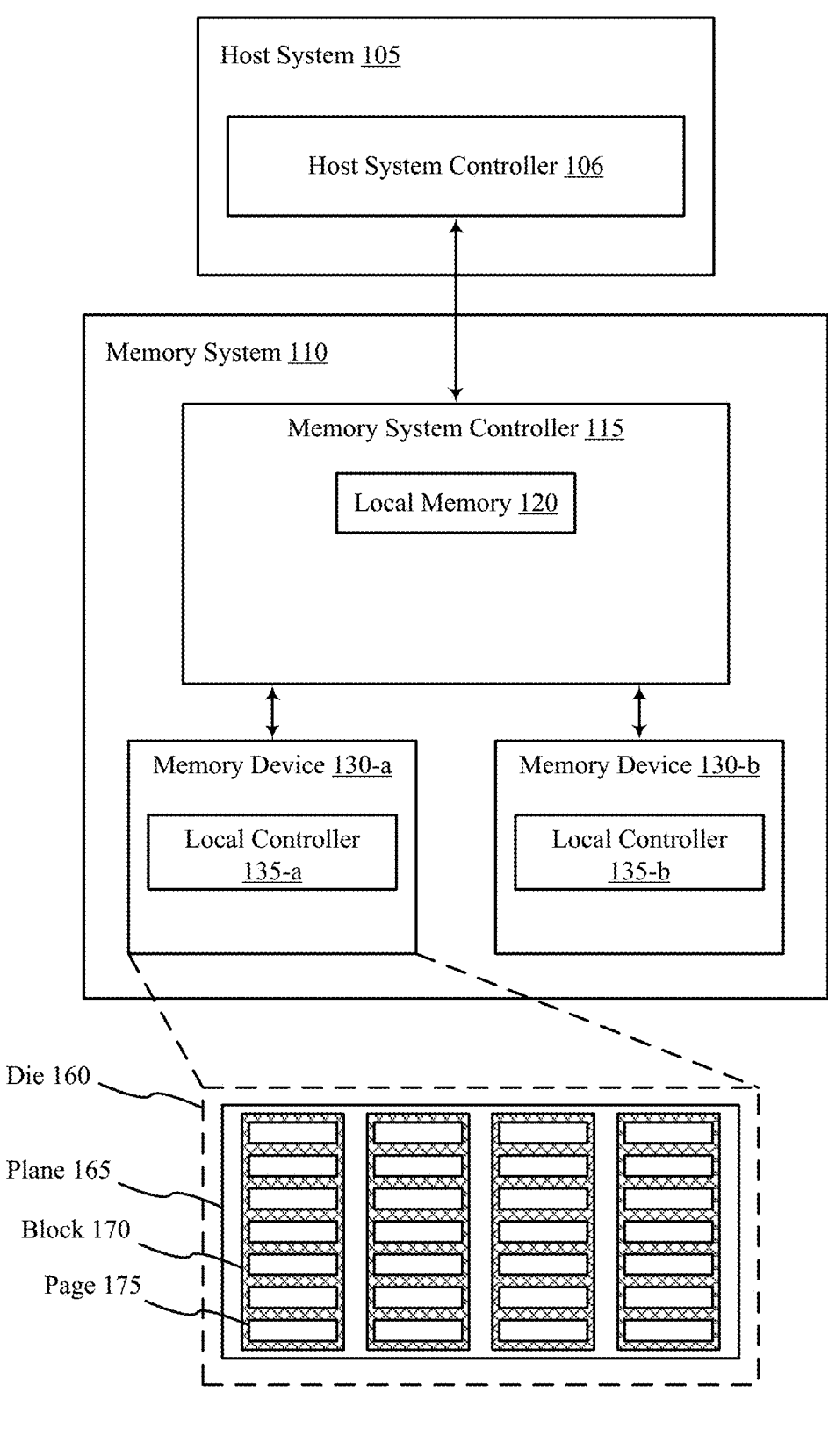
FIG. 1 illustrates an example of a system that supports methods for retiring pages of a memory device in accor- dance with examples as disclosed herein.

FIG. 1 is an example of a system 100 that supports methods for retiring pages of a memory device in accor- dance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of a any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (Fe-RAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support methods for retiring pages of a memory device. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
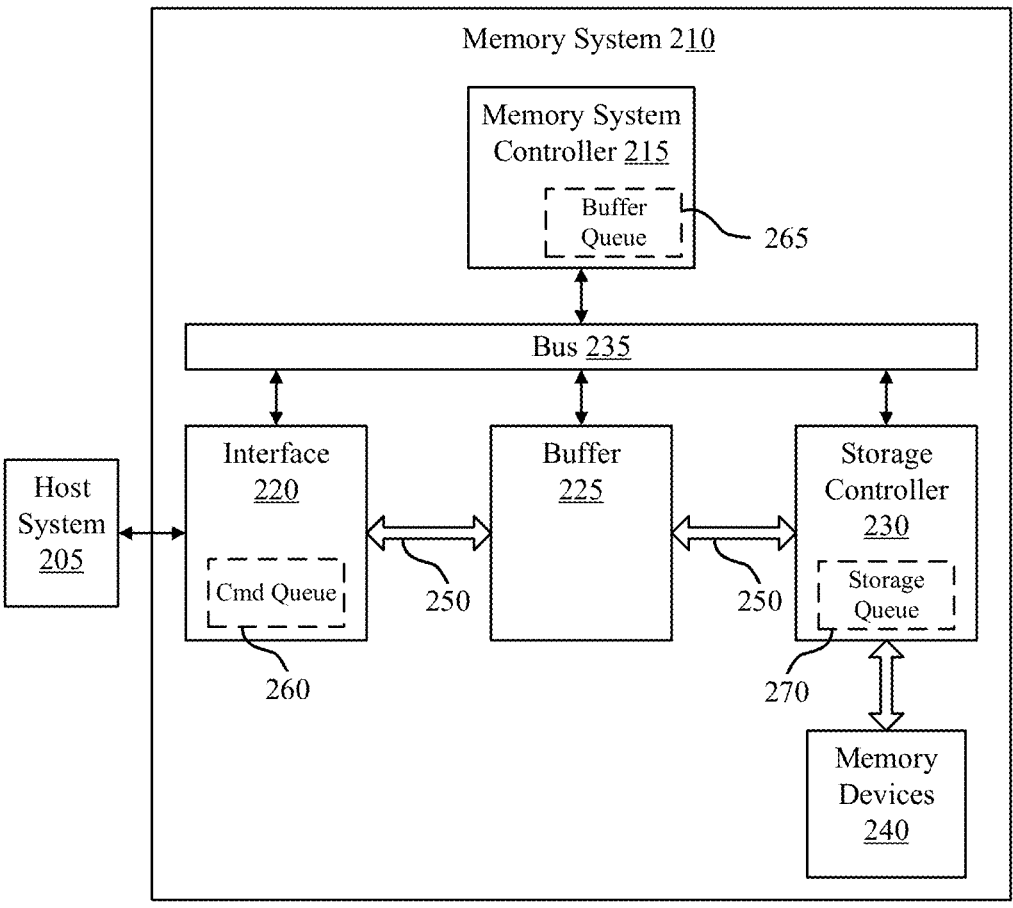
FIG. 2 illustrates an example of a system that supports methods for retiring pages of a memory device in accor- dance with examples as disclosed herein.

FIG. 2 illustrates an example of a memory device 200 that supports methods for retiring pages of a memory device in accordance with examples as disclosed herein. The system 200 may be an example of a system 100 as described with reference to FIG. 1 or aspects thereof. The system 200 may include a memory system 210 configured to store data received from the host system 205 and to send data to the host system 205, when requested by the host system 205 using access commands (e.g., read commands or write commands). The system 200 may implement aspects of system 100 as described with reference to FIG. 1. For example, the memory system 210 and the host system 205 may be examples of the memory system 110 and the host system 105, respectively.

Memory system 210 may include memory devices 240 to store data transferred between memory system 210 and the host system 205, e.g., in response to receiving access commands from the host system 205, as described below. The memory devices 240 may include one or more memory devices as described with reference to FIG. 1. For example, the memory devices 240 may include NAND memory, PCM, self-selecting memory, 3D XPoint, other chalcogenide-based memories, FERAM, MRAM, NOR (e.g., NOR flash) memory, STT-MRAM, CBRAM, RRAM, or OxRAM.

Memory system 210 may include a storage controller 230 for controlling the passing of data directly to and from the memory devices 240, e.g., for storing data, retrieving data, and determining memory locations in which to store data and from which to retrieve data. Storage controller 230 may communicate with memory devices 240 directly or via a bus (not shown) using a protocol specific to each type of memory device. In some cases, a single storage controller 230 may be used to control multiple memory devices of the same or different types. In some cases, memory system 210 may include multiple storage controllers 230, e.g., a different storage controller 230 for each type of memory device 240. In some cases, storage controller 230 may implement aspects of a local controller 135 as described with reference to FIG. 1.

Memory system 210 may additionally include an interface 220 for communication with the host system 205 and a buffer 225 for temporary storage of data being transferred between the host system and the memory devices 240. Interface 220, buffer 225, and storage controller 230, may be for translating data between the host system 205 and the memory devices 240, e.g., as shown by data path 250, and may be collectively referred to as data path components.

Using buffer 225 to temporarily store data during transfers may allow data to be buffered as commands are being processed, thereby reducing latency between commands and allowing arbitrary data size associated with commands. This may also allow bursts of commands to be handled and the buffered data may be stored or transmitted (or both) once a burst has stopped. Buffer 225 may include relatively fast memory (e.g., some types of volatile memory, such as SRAM or DRAM) or hardware accelerators or both to allow fast storage and retrieval of data to and from buffer 225. Buffer 225 may include data path switching components for bi-directional data transfer between buffer 225 and other components.

The temporary storage of data within buffer 225 may refer to the storage of data in buffer 225 during the execution of access commands. That is, upon completion of an access command, the associated data may no longer be maintained in buffer 225 (e.g., may be overwritten with data for additional access commands). In addition, buffer 225 may be a non-cache buffer. That is, data may not be read directly from buffer 225 by the host system 205. For example, read commands may be placed on a queue without an operation to match the address to addresses already in the buffer (e.g., without a cache address match or lookup operation).

Memory system 210 may additionally include a memory system controller 215 for executing the commands received from the host system 205 and controlling the data path components in the moving of the data. Memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., when more than one access command from the host system 205 is processed concurrently by memory system 210. Command queue 260, buffer queue 265, and storage queue 270 are depicted at interface 220, memory system controller 215 and storage controller 230, respectively, as examples of a possible implementation. Queues, if used, may be positioned anywhere within memory system 210.

Data transferred between the host system 205 and the memory devices 240 may take a different path in memory system 210 than non-data information (e.g., commands, status information). For example, the system components in memory system 210 may communicate with each other using bus 235, while the data may use data path 250 through the data path components instead of bus 235. Memory system controller 215 may control how and when data is transferred between the host system 205 and the memory devices 240 by communicating with the data path components over bus 235 (e.g., using a protocol specific to memory system 210).

When a host system 205 transmits access commands to memory system 210, the commands may be received by interface 220, e.g., according to a protocol (e.g., a universal flash storage (UFS) protocol or an eMMC protocol). Thus, interface 220 may be considered a front end of memory system 210. Upon receipt of each access command, interface 220 may communicate the command to memory system controller 215, e.g., via bus 235. In some cases, each command may be added to command queue 260 by interface 220 to communicate the command to memory system controller 215.

Memory system controller 215 may determine that an access command has been received based on the communication from interface 220. In some cases, memory system controller 215 may determine the access command has been received by retrieving the command from command queue 260. The command may be removed from command queue 260 after it has been retrieved therefrom, e.g., by memory system controller 215. In some cases, memory system controller 215 may cause interface 220, e.g., via bus 235, to remove the command from command queue 260.

Upon the determination that an access command has been received, memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, memory system controller 215 may use buffer 225 for, among other things, temporary storage of the data being received from or sent to the host system 205. Buffer 225 may be considered a middle end of memory system 210. In some cases, buffer address management (e.g., pointers to address locations in the buffer) may be performed by hardware (e.g., dedicated circuits) in the interface 220, buffer 225, or storage controller 230.

To process a write command received from the host system 205, memory system controller 215 may first determine if buffer 225 has sufficient available space to store the data associated with the command. For example, memory system controller 215 may determine, e.g., via firmware (e.g., controller firmware), an amount of space within buffer 225 that may be available to store data associated with the write command.

In some cases, buffer queue 265 may be used to control flow of commands associated with data stored in buffer 225 including write commands. Buffer queue 265 may include the access commands associated with data currently stored in buffer 225. In some cases, the commands in command queue 260 may be moved to buffer queue 265 by memory system controller 215 and may remain in buffer queue 265 while the associated data is stored in buffer 225. In some cases, each command in buffer queue 265 may be associated with an address at buffer 225. That is, pointers may be maintained that indicate where in buffer 225 the data associated with each command is stored. Using buffer queue 265, multiple access commands may be received sequentially from the host system 205 and at least portions of the access commands may be processed concurrently.

If buffer 225 has sufficient space to store the write data, memory system controller 215 may cause interface 220 to transmit an indication of availability to the host system 205 (e.g., a "ready to transfer" indication), e.g., according to a protocol (e.g., a UFS protocol or an eMMC protocol). As interface 220 subsequently receives from the host system 205 the data associated with the write command, interface 220 may transfer the data to buffer 225 for temporary storage using data path 250. In some cases, interface 220 may obtain from buffer 225 or buffer queue 265 the location within buffer 225 to store the data. Interface 220 may indicate to memory system controller 215, e.g., via bus 235, when the data transfer to buffer 225 has been completed.

Once the write data has been stored in buffer 225 by interface 220, the data may be transferred out of buffer 225 and stored in a memory device 240. This may be done using storage controller 230. For example, memory system controller 215 may cause storage controller 230 to retrieve the data out of buffer 225 using data path 250 and transfer the data to a memory device 240. Storage controller 230 may be considered a back end of memory system 210. Storage controller 230 may indicate to memory system controller 215, e.g., via bus 235, when the data transfer to a memory device of the memory devices 240 has been completed.

In some cases, storage queue 270 may be used to aid with the transfer of write data. For example, memory system controller 215 may push (e.g., via bus 235) write commands from buffer queue 265 to storage queue 270 for processing. Storage queue 270 may include entries for each access command, and may include, e.g., a buffer pointer (e.g., an address) that may indicate where in buffer 225 the data associated with the command is stored and a storage pointer (e.g., an address) that may indicate the location in the memory devices 240 associated with the data. In some cases, storage controller 230 may obtain from buffer 225, buffer queue 265, or storage queue 270 the location within buffer 225 from which to obtain the data. Storage controller 230 may manage the locations within the memory devices 240 to store the data (e.g., performing wear-leveling, garbage collection, and the like). The entries may be added to storage queue 270, e.g., by memory system controller 215. The entries may be removed from the storage queue 270, e.g., by storage controller 230 or memory system controller 215 upon completion of the transfer of the data.

To process a read command received from the host system 205, memory system controller 215 may again first determine if buffer 225 has sufficient available space to store the data associated with the command. For example, memory system controller 215 may determine, e.g., via firmware (e.g., controller firmware), an amount of space within buffer 225 that may be available to store data associated with the read command.

In some cases, buffer queue 265 may be used to aid with buffer storage of data associated with read commands in a similar manner as discussed above with respect to write commands. For example, if buffer 225 has sufficient space to store the read data, memory system controller 215 may cause storage controller 230 to retrieve the data associated with the read command from a memory device 240 and store the data in buffer 225 for temporary storage using data path 250. Storage controller 230 may indicate to memory system controller 215, e.g., via bus 235, when the data transfer to buffer 225 has been completed.

In some cases, storage queue 270 may be used to aid with the transfer of read data. For example, memory system controller 215 may push the read command to storage queue 270 for processing. In some cases, storage controller 230 may obtain from buffer 225 or storage queue 270 the location within the memory devices 240 from which to retrieve the data. In some cases, storage controller 230 may obtain from buffer queue 265 the location within buffer 225 to store the data. In some cases, storage controller 230 may obtain from storage queue 270 the location within buffer 225 to store the data. In some cases, memory system controller 215 may move the command processed by storage queue 270 back to command queue 260.

Once the data has been stored in buffer 225 by storage controller 230, the data may be transferred out of buffer 225 and sent to the host system 205. For example, memory system controller 215 may cause interface 220 to retrieve the data out of buffer 225 using data path 250 and transmit the data to the host system 205, e.g., according to a protocol (e.g., a universal flash storage (UFS) protocol or an eMMC protocol). For example, the interface 220 may process the command from command queue 260 and may indicate to memory system controller 215, e.g., via bus 235, when the data transmission to the host system 205 has been completed.

Memory system controller 215 may execute received commands according to an order (e.g., a first-in, first-out order, according to the order of the command queue 260). For each command, memory system controller 215 may cause data corresponding to the command to be moved into and out of buffer 225, as discussed above. As the data is moved into and stored within buffer 225, the command may remain in buffer queue 265. A command may be removed from buffer queue 265, e.g., by memory system controller 215, when the processing of the command has been completed (e.g., when data corresponding to the access command has been transferred out of buffer 225). When a command is removed from buffer queue 265, the address previously storing the data associated with that command may be available to store data associated with a new command.

Memory system controller 215 may additionally be configured for operations associated with the memory devices 240. For example, memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may be noncontiguous physical block addresses. In some cases, storage controller 230 may be configured to perform one or more of the above operations in conjunction with or instead of memory system controller 215. In some cases, memory system controller 215 may perform the functions of storage controller 230 and storage controller 230 may be omitted.

Figure 3A:
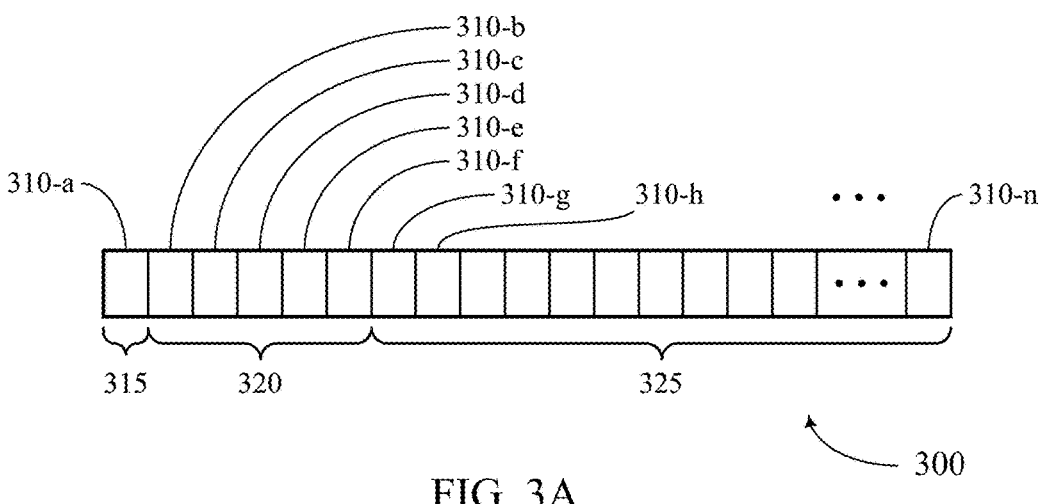
FIGS. 3A and 3B illustrate a layout of a page and an example of a system that uses the page, both supporting methods for retiring pages of a memory device in accor- dance with examples as disclosed herein.

FIG. 3A illustrates an example of a layout of a device information page 300 that supports methods for retiring pages of a memory device in accordance with examples as disclosed herein. The page may be comprised of non-volatile memory cells. An ordered set of such pages may be used to store device information for use by the device, such as configuration, status, or security information so they can be used at power-up of the device. The device information page may be retired before integrity of the information is lost due to deteriorating reliability based on the number of page accesses.

Device information page 300 may include a plurality of bits 310 (e.g., bits 310-*a* through 310-*n*). In some examples, device information page 300 may include a flag portion 315 for storing a flag corresponding to the page. In some examples, the flag may be used as a page selector to reflect when the page has been retired or reached an endurance limit. For example, when "set", the flag may indicate that the device information page 300 has been retired and when "not set" (or "cleared" or "reset"), the flag may indicate that the page has not been retired and may be used.

In some examples, the flag may be used to reflect when the programming of a fuse element associated with the device information page 300 is in progress. For example, when set, the flag may indicate that the programming of the fuse element has been initiated but not yet completed and when not set, the flag may indicate that no programming of the fuse element is in progress (e.g., a programming was initiated and completed, or no programming was initiated).

In some examples, the flag portion may be a single bit (e.g., bit 310-*a*) and the flag may be set when it is a logic "1" and not set when it is a logic "0". Alternatively, the flag may be set when it is a logic "0" and not set when it is a logic "1". In some examples, the flag portion may include a plurality of bits and the flag may be set when a percentage of the bits of the flag portion are set (e.g., 75% or higher, 80% or higher).

In some examples, device information page 300 may include a counter portion 320 for storing a counter value corresponding to the page. In some examples, the counter value may be used to determine when the page has reached or exceeded a cell endurance limit. In some examples, the counter value may reflect the number of accesses performed on the device information page; each time the device page 300 may be accessed, the counter value may be incremented. Incrementing the counter value may be performed, e.g., by reading the counter value into a counter, incrementing the counter, and writing the counter value back into the counter portion of the page. In this manner, the counter portion of the page may reflect the number of times the page has been accessed. The counter value may be monitored to detect when it reaches a predetermined number that may reflect when the page has reached or has nearly reached an endurance limit. When the counter value reflects that the endurance limit has been reached, the flag of the page may be set to indicate so.

The counter portion 320 of the device information page 300 may incorporate any number of bits (e.g., bits 310-*b* through 310-*f*). For example, if an endurance limit of a device information page 300 is 32 accesses, the counter portion 320 may incorporate six bits, which would allow a binary count of 32 to be reached with an extra bit to allow counts above 32. Typical endurance limits may be in the thousands, tens of thousands, hundreds of thousands, millions, or possibly higher. In some cases, each time a page is used may be considered one access, and may involve one read (e.g., at power-up), and one write (e.g., at power-down). Alternatively, pages may be accessed additional times when the device is in operation. For example, new information may be written when it is updated during operation. In some cases, the counter portion 320 may record reads and writes separately, or may weight the operations differently. For example, the counter portion 320 may include a counter for read operations and a counter for write operations, or may include one counter, where, for example, write operations are recorded using a weighting factor. In one example, the counter portion 320 may be incremented by one for each read operation, and by an integer greater than one (e.g., 5, 10) for each write operation.

The device information page 300 may include a data portion 325 for storing data, e.g., associated with the device. This may include, e.g., knowledge of the last power cycle, security data, state data, and the like. This information may be used after a power cycle, e.g., to restore the state of the computer, or verify access privilege of the user. The data portion 325 may incorporate any number of bits (e.g., bits 310-*g* through 310-*n*).

Figure 3B:
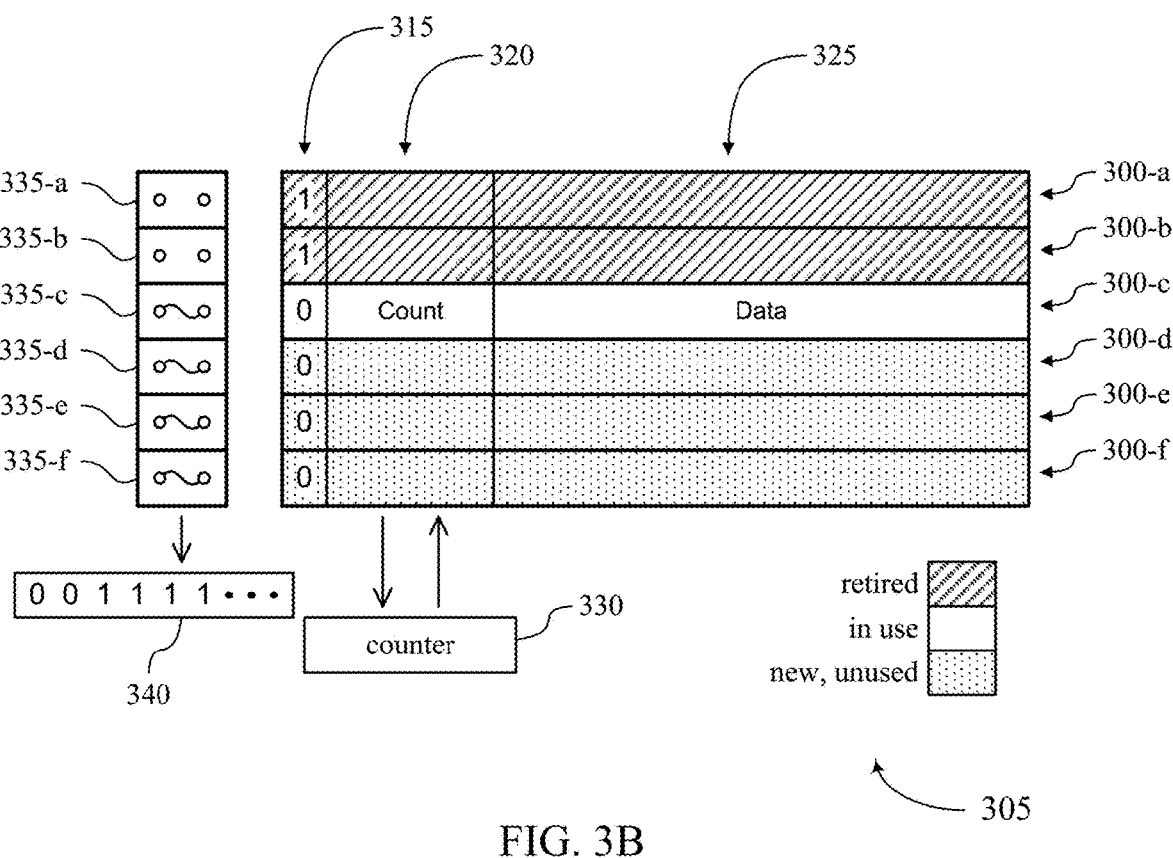

FIG. 3B illustrates an example of a system 305 that supports methods for retiring pages of a memory device in accordance with examples as disclosed herein. System 305 may include a set of device information pages 300 (e.g., device information pages 300-*a* through 300-*f*), each having a counter portion 320 and a data portion 325. In some examples, each device information page 300 may also include a flag portion 315 (e.g., as a page selector). In some examples, the device information pages 300 may belong to a same block, such as a block 170, discussed with reference to FIG. 1. In some examples, system 305 may include a set of fuse elements 335 (e.g., fuse elements 335-*a* through 335-*f*), each associated with a device information page 300 (e.g., as a page selector). The fuse elements 335 may be included in place of or in conjunction with the flag portions 315, as discussed in more detail below.

In some examples, the device information pages 300 may be positioned in a particular order and may be used, one at a time, in that particular order. For example, device information may be stored and retrieved from a first device information page 300-*a* until it is determined (e.g., using the counter value of the page) that the number of accesses of the page has reached or exceeded a cell endurance limit. When that occurs, the device information page 300-*a* may be retired (e.g., using the page's flag or associated fuse element 335-*a*) and the next page in the order (e.g., device information page 300-*b*) may be used. That is, system information may be stored and retrieved from the second device information page 300-*b* instead of the first device information page 300-*a*. Similar to the first page, the second page may be used until it is determined that the number of accesses of the second page has reached or exceeded the cell endurance limit, at which time the second page may also be retired and the next page in the order (e.g., device information page 300-*c*) may be used. This may continue until all the device information pages have been used.

In the example shown in FIG. 3B, the third device information page 300-*c* is the page in use and the preceding pages (device information pages 300-*a* and 300-*b*) have been retired. In light of this, the page selectors (e.g., flags 315) of pages 300-*a* and 300-*b* may be set (e.g., "1") and of page 300-*c* may not be set (e.g., "0"). The flags 315 of the rest of the pages (e.g., device information pages 300-*d* through 300-*f*) may also not be set (e.g., "0") to indicate that those pages have also not been retired. Alternatively, if fuse elements are used as page selectors, the fuse elements 335-*a* and 335-*b* associated with the first two device information pages 300*a* and 300-*b* may have been programmed (e.g., blown) to indicate retirement of those pages.

During power up, the flag 315 of the first device information page 300-*a* may be retrieved and determined to be set. This may indicate that the first page 300-*a* has been retired and its data may not be valid. The flag 315 of the next page (second device information page 300-*b*) may be retrieved and also determined to be set. This may indicate that the second page 300-*b* has also been retired and its data may not be valid. The flag 315 of the next page (third device information page 300-*c*) may be retrieved and determined to be not set. This may indicate that the third page 300-*c* is the first page in the order that has not been retired and that the page may contain valid data.

Alternatively, a data message (e.g., data message 340) may be retrieved showing the state of each fuse element 335. In some examples, the state of each fuse element may be reflected in a different bit in the message. The message may be analyzed to determine that the device information pages 300-*a* and 300-*b* have been retired and that device information page 300-*c* is the first page in the order that has not.

After determining that device information page 300-*c* is to be used, the data stored in the data portion 325 of page 300-*c* may be retrieved and used to restore the device. The counter value stored in the counter portion 320 of the page 300-*c* may be incremented to reflect the access of the page (e.g., by reading the value into a counter 330, incrementing the counter, and writing the counter value back into the counter portion of the page). The counter value may then be compared to a threshold (e.g., a page endurance level) to determine if the page 300-*c* should be retired. If the counter value of page 300-*c* is greater than or equal to the threshold, the flag 315 of the page may be set (e.g., by writing a "1" into the flag portion of the page) or the fuse element 335-*c* associated with the page may be programmed (e.g., by commanding the system to blow the fuse element) to indicate retirement of the page 300-*c*. The device information obtained from device information page 300-*c* may be saved to the data field 325 of the original device information page 300-*c* (if the page is not being retired) or of the next device information page 300-*d* (if the original page 300-*c* is being retired) for use as valid data moving forward.

Figure 4:
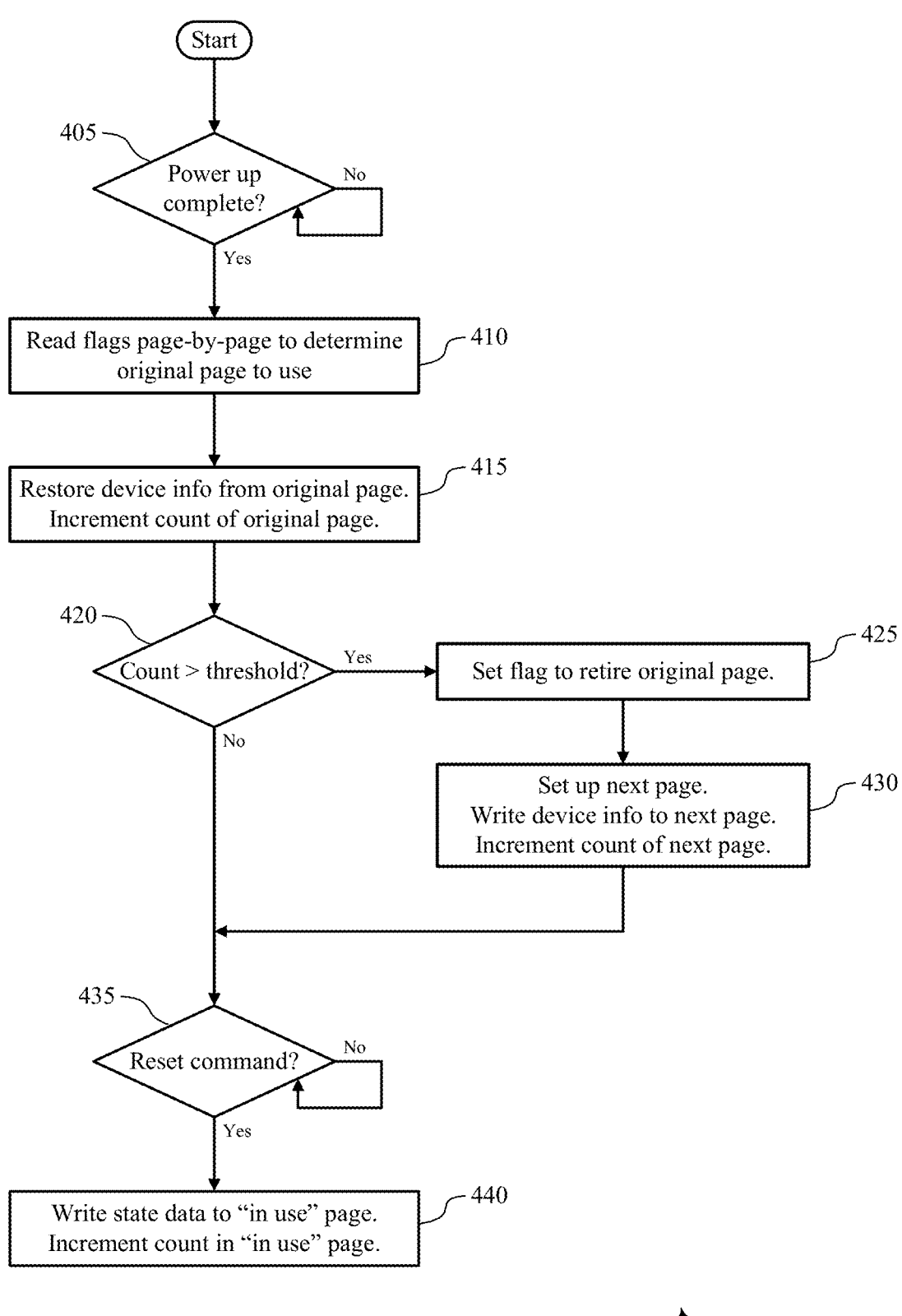
FIGS. 4-6 show flowcharts illustrating methods that sup- port methods for retiring pages of a memory device in accordance with examples as disclosed herein.
Figure 5:
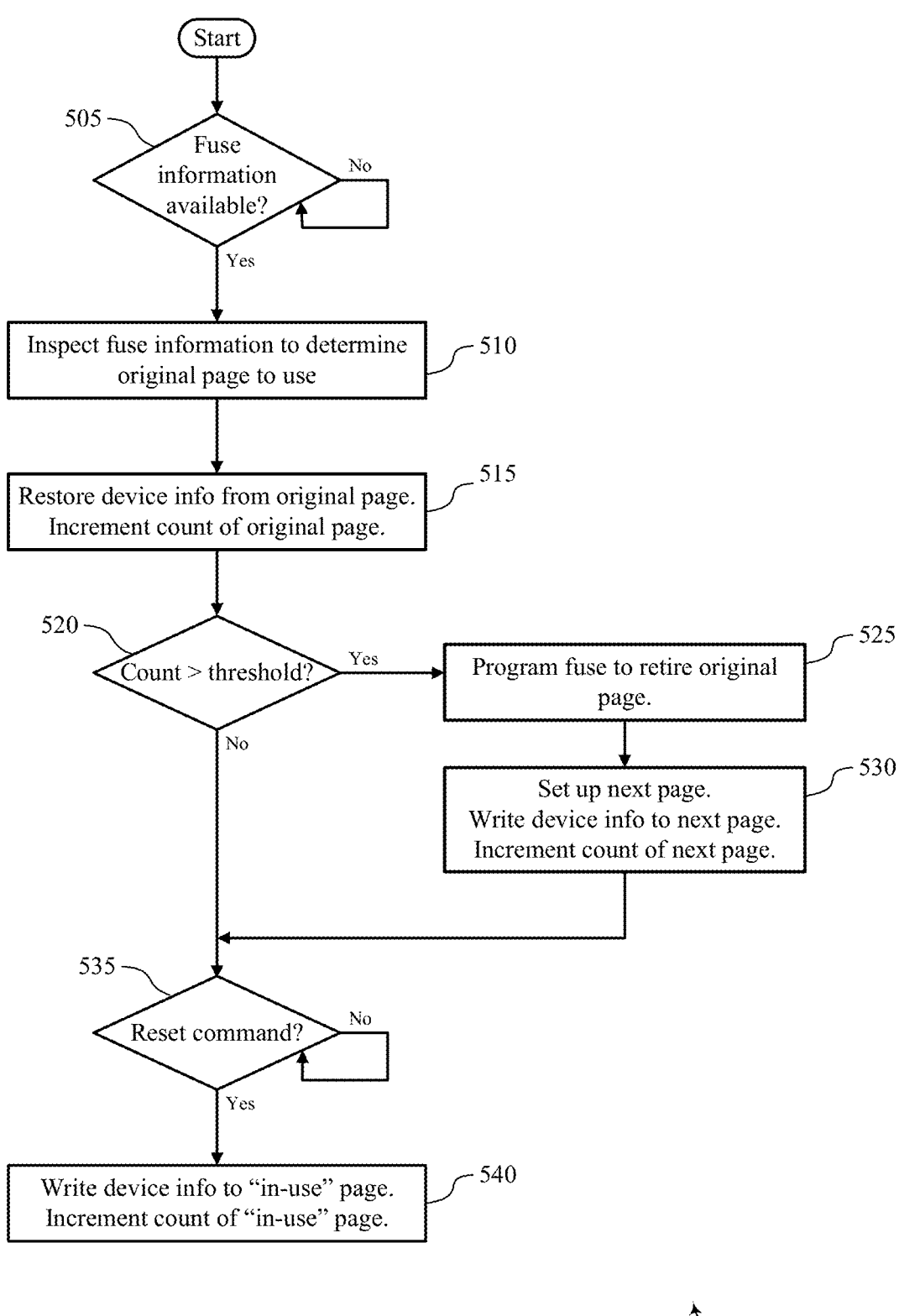
Figure 6:
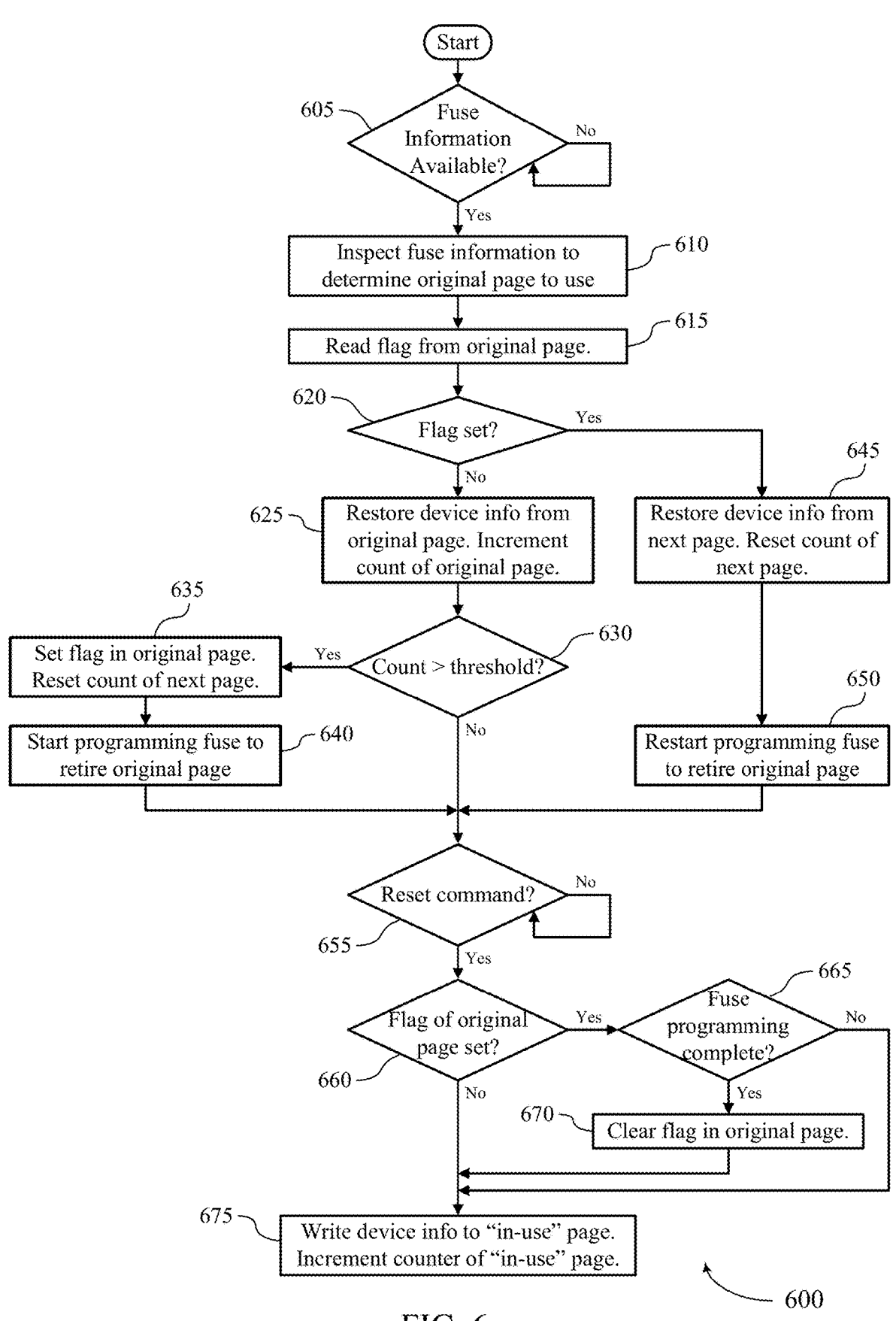

FIGS. 4-6 show flowcharts illustrating examples of methods 400, 500, and 600 that support methods for retiring pages of a memory device in accordance with examples as disclosed herein. In methods 400, 500, and 600, selectors (e.g., flags and fuse elements) and counters associated with device information pages are used to determine which page to use and when to switch to the next page. The operations of any of the methods 400, 500, or 600 may be implemented by a memory system or its components as described herein. For example, the operations of any of the methods 400, 500, or 600 may be performed by a memory device 130 as described with reference to FIG. 1. In some examples, a memory system may execute a set of instructions to control the functional elements of the memory device to perform the described functions. Additionally or alternatively, a memory device may perform aspects of the described functions using special-purpose hardware.

FIG. 4 shows a flowchart illustrating an example of a method 400 that supports methods for retiring pages of a memory device in accordance with examples as disclosed herein. Method 400 may be used at power-up to determine which device information page may be in use and when and how to switch to the next page. In method 400, flags and counts embedded with the device information pages may be employed in doing so.

At 405, it may be determined if a power up has been completed. In some examples, this may be determined by monitoring a PwrUp signal. If the power up has not been completed, the method may wait at 405 until it has. Once power up is complete, the method may continue to 410.

At 410, flags of the device information pages may be used to determine a page to use. In some examples, a flag of each page may be read until a flag value is obtained indicating the corresponding page may contain valid data. In some examples, the pages may be positioned in an order and the flags of the pages may be read starting with the first page and continuing in the order with the other pages. In some examples, the flag may be a single bit and may contain a logic "1" to indicate the corresponding page may contain valid data and may be used. In other examples, the flag may contain a logic "0" to indicate the page may contain valid data and may be used. In some examples, the flag may include a plurality of bits and a percentage of the bits may be set (e.g., 66% or higher, 75% or higher, 80% or higher) to indicate the corresponding page may be used. Once a flag may be encountered indicating the page may be used, the corresponding page may be considered to be an original "in-use" device information page for the method.

At 415, device information may be restored from the original page and used by the memory system. Also at 415, a counter value corresponding to the original page may be incremented to reflect accessing the page.

At 420, the counter value obtained at 415 may be compared with a threshold, e.g., a cell endurance limit. If the counter value of the original page has not exceeded the threshold, the cells of the original page may be considered to contain valid data, and the method may continue to 435.

If the counter value of the original page has exceeded the threshold, the cells of the page may be nearing a point at which the data contained in the page may become susceptible to invalidity issues, e.g., due to breakdown of the cells of the page. To alleviate these problems, the original page may be retired so that the cells associated therewith may discontinue to be used. If the counter value of the original page has exceeded the threshold, the method may continue to 425 to retire the page.

At 425, the original page may be retired. In some examples, retirement of the page may be accomplished by changing (e.g., setting or clearing) the page's flag. In some examples in which the flag may be a single bit, the flag may be changed to a logic "0" to set the flag. In some examples, the flag may be changed to a logic "1" to set the flag. Setting the flag may cause the original page to not be used at the next power-up.

At 430, the next page in the order may be set up to replace the newly retired page as the new device information page to be used. In some examples, a counter value corresponding to the next page may be reset (e.g., to a value of 0 or 1). In some examples, the flag of the next page may be set or cleared. In some examples, the flag may already reflect a correct value so that no change to it may occur. Also at 430, the device information may be written to the next page. In some examples, this may include the device information that was previously stored in the original (now-retired) page. The counter value corresponding to the next page may be incremented to reflect accessing the page. The next page may be considered to be the new "in-use" device information page.

At 435, it may be determined if a reset command has been received. In some examples, the reset command may be a system command that may indicate a power down of the memory device is imminent. If the reset command has not been received, the method may wait at 435 until it has. Once a reset command is received, the method may continue to 440.

At 440, the device information may be written to the in-use page. The in-use page may be the original page, or the new page, depending on whether steps 425 and 430 were used. In some examples, the in-use page may be determined by the flag of the original page: if the flag is one value, the original page may be the in-use page; if it is a different value, the original page may have been retired and the new page may be the in-use page. Also at 440, the counter value corresponding to the in-use page may be incremented to reflect accessing the page.

FIG. 5 shows a flowchart illustrating an example of a method 500 that supports methods for retiring pages of a memory device in accordance with examples as disclosed herein. Similar to method 400, method 500 may be used at power-up to determine which device information page may be in use and when and how to switch to the next page. But instead of employing flags embedded with the pages, method 500 may use fuse elements associated with the pages. Once the original page has been determined based on the fuse elements, method 500 may generally follow the same steps as method 400, with a few exceptions due to the use of the fuse elements.

During power up, information about system fuse elements (e.g., which fuses are shorted and which ones are blown) may become available. At 505, the method may wait until the fuse element information is available. In some examples, this may be accomplished by monitoring the TMBroadcast signal. Once the fuse element information becomes available, the method may continue to 510.

At 510, the fuse element information associated with the device information pages may be obtained and used to determine which page to use. In some examples, the fuse information associated with each device information page may be inspected to identify a first fuse that is not programmed (e.g., not blown). This may indicate the page associated with that fuse may be used as the in-use page. In some examples, the pages may be positioned in an order and the fuse information associated with the pages may be read in the same order. In some examples the fuse information may be obtained from power-up information. In some examples a single bit may be used to indicate the state of the fuse element associated with each page and the bits may be inspected to determine the first fuse that is not blown. Once a fuse value is determined indicating the page may be used, the corresponding page may be considered to be the original "in-use" device information page for the method.

At 515, device information data may be restored from the original page and used by the memory system. Also at 515, a counter value corresponding to the original page may be incremented to reflect accessing the page. This step may be similar to step 415 of step 400.

At 520, the counter value obtained at 515 may be compared with a threshold. If the counter value of the original page has exceeded the threshold the method may continue to 525 to retire the page. Otherwise the method may continue to 535. This step may be similar to step 420 of step 400.

At 525, the original page may be retired. But instead of changing a flag value, as in method 400, retiring the page may involve changing the value of a fuse element. In some examples, retirement of the original page may be accomplished by programming (e.g., blowing or setting) the fuse element associated with the page. In some examples, a non-volatile variable may be set so that at the next power up, it may trigger the memory system to program the fuse element associated with the original page. Either way, programming the fuse element may cause the original page to not be used during future power-ups.

At 530, the next page in the order may be set up to replace the newly retired page as the new device information page. In some examples, a counter value corresponding to the next page may be reset. Also at 530, the device information may be written to the next page. The counter value corresponding to the next page may be incremented to reflect accessing the page. The next page may be considered to be the new "in-use" device information page.

At 535, it may be determined if a reset command has been received. If the reset command has not been received, the method may wait at 535 until it has. Once a reset command is received, the method may continue to 540. This step may be similar to step 435 of step 400.

At 540, the device information may be written to the in-use device page. The in-use page may be the original page, or the new page, depending on whether steps 525 and 530 were used. Also at 540, the counter value corresponding to the in-use device page may be incremented to reflect accessing the page. This step may be similar to step 440 of step 400.

One issue that may arise with the use of fuse elements as the page selector is the amount of time it may take to program (e.g., blow) the fuse elements. There may be times when the programming of a fuse element may take so long that it is not completed before a power cycle occurs. As a result, when the system powers up, the fuse may still be unprogrammed (e.g., shorted for a fuse, open for an anti-fuse). This may allow an associated page to be used as the device page, as the fuse information may still reflect that the fuse has not been blown.

FIG. 6 shows a flowchart illustrating an example of a method 600 that supports methods for retiring pages of a memory device in accordance with examples as disclosed herein. Similar to method 500, method 600 may employ fuse elements and counts at power-up to determine which device information page may be in use and when and how to switch to the next page. Method 600 also uses the flags embedded in the pages to identify situations where the programming of the fuse elements may not have completed before a power cycle.

At 605, the method may wait until the fuse information is available. This step may be similar to step 505 of method 500. Once the fuse information becomes available, the method may continue to 610.

At 610, the fuse information associated with the pages may be obtained and inspected to determine which page to use as the original "in-use" device information page for the method. This step may be similar to step 510 of step 500.

At 615, the flag of the original page may be read and analyzed to determine the state of the fuse element associated with the page. For example, when set, the flag may indicate that the programming of the fuse element has been initiated but not yet completed and when not set, the flag may indicate that no programming of the fuse element is in progress.

At 620, if the flag is not set, the fuse element associated with the original page may not be in the process of being programmed. That is, any programming (e.g., blowing) of the fuse element may have already completed. In that case, the device information for the original page may be valid and the method may continue to 625.

If the flag of the original page is set, however, the fuse element associated with the page may be in the process of being programmed (e.g., blown). That is, the programming of the fuse element associated with the original page may have been initiated but may not have been completed. In that case, the fuse information used at 610 to identify the original page, may not have taken this into account. In other words, because the programming of the fuse element may not have been completed, the associated page may have been erroneously identified as the original page to use. If the flag is set, the method may continue to 645 to correct this error.

At 625, device information may be restored from the original page and used by the memory system. Also at 625, a counter value corresponding to the original page may be incremented to reflect accessing the page. This step may be similar to step 615 of step 500.

At 630, the counter value obtained at 625 may be compared with a threshold. If the counter value of the original page has exceeded the threshold, the method may continue to 635 to retire the page. Otherwise, the method may continue to 655. This step may be similar to step 520 of step 500.

At 635, the flag in the original page may be set (e.g., by writing a "1" to the flag portion of the page) to indicate that the programming of the fuse element associated with the page is about to begin. The flag may remain set until the programming of the fuse element has completed (see 670). Also at 635, the counter value corresponding to the next page may be reset.

At 640, programming (e.g., blowing or setting) of the fuse element associated with the original page may be initiated to retire the page. In some examples, a non-volatile variable may be set so that at the next power up, it may trigger the memory system to program the fuse element associated with the original page.

At 645, since the flag of the original page may be set, the next page may be meant to be the in-use device information page even though the programming of the fuse element associated with the original page may not have been completed. So at 645, device information may be restored from the next page and used by the memory system. Also at 645, the counter value corresponding to the next page may be reset (e.g., to a value of 0 or 1).

At 650, programming (e.g., blowing or setting) of the fuse element associated with the original page may be resumed or reinitiated to retire the page.

At 655, it may be determined if a reset command has been received. If the reset command has not been received, the method may wait at 655 until it has. Once a reset command is received, the method may continue to 660.

At 660, the flag of the original page may again be analyzed to determine the state of the fuse element associated with the page. If the flag is set, programming of the associated fuse element may have been initiated, e.g., at 640 or 650. In that case, the method may continue to 665. If the flag is not set, any programming of the fuse element that was initiated may have already been completed. In that case, the method may continue to 675.

At 665, it may be determined whether the initiated programming of the fuse element associated with the original page has been completed. In some examples, this may be accomplished by obtaining and analyzing updated information reflecting the states of the fuses. If the programming of the fuse element has been completed, the method may continue to 670, otherwise, the method may continue to 675.

At 670, the flag of the original page may be cleared (e.g., by writing a "0" to the flag portion of the page) to indicate the completion of the programming of the fuse element associated with the page.

At 675, the device information may be written to the in-use device page. The in-use page may be the original page, or the new page, depending on if step 640 or 650 were used. If 675 was entered directly from 665, the flag of the original page may be set, indicating that programming of the fuse element associated with the original page may not have been completed. The flag (that may now be set) may be read at the next power up at 615 and the fuse element programming may then be completed. Also at 675, the counter value corresponding to the in-use page may be incremented to reflect accessing the page.

Figure 7:
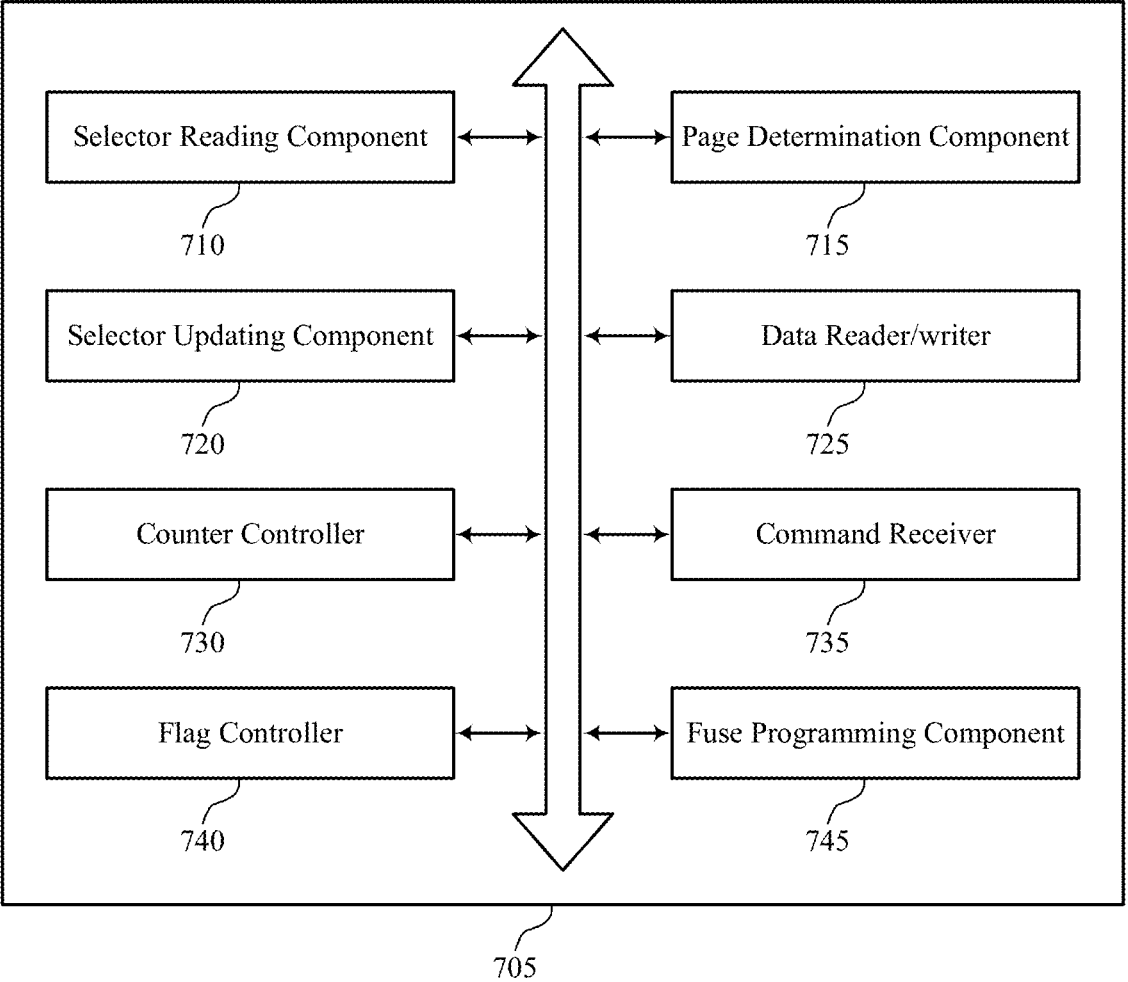
FIG. 7 shows a block diagram of a memory device that supports methods for retiring pages of a memory device in accordance with aspects of the present disclosure.

FIG. 7 shows a block diagram 700 of a memory device 705 that supports methods for retiring pages of a memory device in accordance with examples as disclosed herein. The memory device 705 may be an example of aspects of a memory device as described with reference to FIGS. 1 and 2. The memory device 705 may include a selector reading component 710, a page determination component 715, a selector updating component 720, a data reader/writer 725, a counter controller 730, a command receiver 735, a flag controller 740, and a fuse programming component 745. Each of these modules may communicate, directly or indirectly, with one another (e.g., via one or more buses).

The selector reading component 710 may obtain, at power up, a first selector value from a first selector associated with a first page of a set of pages of non-volatile memory. In some examples, the selector reading component 710 may obtain a third selector value associated with a third page of the set of pages. In some cases, the first selector may include a fuse element associated with the first page. In some cases, the first selector may include a flag stored in the first page. In some cases, the flag may include a set of bits.

The page determination component 715 may determine, based on the first selector value, that the first page contains valid data. In some examples, determining that the first page contains valid data may include determining that the first page contains valid data when a threshold percentage of a set of bits of the flag are set. In some examples, the page determination component 715 may determine that the first page is to be retired based on a counter value associated with the first page. In some examples, determining that the first page is to be retired may include determining that the counter value is above a threshold.

In some examples, the page determination component 715 may perform, starting with a page in a first position in an order and according to the order until a page of the set of pages is found that has not been retired, a page determination process. The page determination process may include obtaining a selector value corresponding to the page and determining if the page has been retired, based on the selector value. In some examples, pages that are positioned before the first page in the order may have been retired, as reflected in the corresponding selector values. In some examples, pages that are positioned after the first page in the order may not have been retired, as reflected in the corresponding selector values.

In some examples, the page determination component 715 may determine, based on the third selector value, that the third page has been retired. In some examples, obtaining the first selector value associated with the first page may be based on determining that the third page has been retired.

The selector updating component 720 may update the first selector value associated with the first page to reflect retirement of the first page. In some examples, updating the first selector value to reflect retirement of the first page includes setting a first flag stored in the first page. In some examples, updating the first selector value to reflect retirement of the first page includes programming a first fuse element associated with the first page. In some examples, the selector updating component 720 may update a second selector value associated with the second page to reflect that the second page contains valid data.

The data reader/writer 725 may write data to a second page of the set of pages in place of the first page. In some examples, the data reader/writer 725 may obtain, based on determining that the first page contains valid data, state data from the first page. In some examples, the data reader/writer 725 may write the state data to the second page. In some examples, writing data to the second page is based on receiving a reset command. In some examples, the data reader/writer 725 may obtain, based on determining that the programming of the fuse element has not been completed, data from a second page.

The counter controller 730 may obtain a counter value associated with the first page. In some examples, obtaining the counter value associated with the first page may include reading the counter value from the first page. In some examples, the counter controller 730 may determine the counter value associated with the first page. In some examples, determining the counter value associated with the first page may include reading the counter value from the first page. In some examples, the counter controller 730 may obtain a second counter value associated with the first page. In some examples, the counter controller 730 may increment the second counter value to obtain the counter value. In some examples, the counter controller 730 may obtain, prior to the power-up of the memory device, a counter value of the page.

The command receiver 735 may receive a reset command.

The flag controller 740 may obtain, upon a power-up of a memory device, a first flag value from a flag of a page of a set of pages of non-volatile memory. In some examples, the flag controller 740 may set, based on determining that the page is to be retired, the flag of the page to a first flag value. In some examples, the flag controller 740 may write, based on determining that the programming of a fuse element is completed, a second flag value to the flag of the page. In some examples, the flag controller 740 may initiate, based on setting the flag, a page change operation of the memory device. The page change operation may include programming a fuse element.

In some examples, the fuse programming component 745 may determine that the programming of the fuse element is completed. The fuse programming component 745 may determine, based on a flag value, that a programming of a fuse element associated with the page has not been completed. In some examples, determining that the programming of the fuse element associated with the page has not been completed may include determining that the programming of the fuse element associated with the page has not been completed when a threshold percentage of a set of bits of the flag are set. In some examples, the fuse programming component 745 may continue, based on determining that the programming of the fuse element has not been completed, the programming of the fuse element. In some cases, the programming of the fuse element may indicate that the page is retired.

FIG. 8 shows a flowchart illustrating a method 800 that supports methods for retiring pages of a memory device in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the memory device may obtain, at power up, a first selector value from a first selector associated with a first page of a set of pages of non-volatile memory. The operations of 805 may be performed according to the methods described herein. In some examples, aspects of the operations of 805 may be performed by a selector reading component as described with reference to FIG. 7.

At 810, the memory device may determine, based on the first selector value, that the first page contains valid data. The operations of 810 may be performed according to the methods described herein. In some examples, aspects of the operations of 810 may be performed by a page determination component as described with reference to FIG. 7.

At 815, the memory device may determine that the first page is to be retired based on a counter value associated with the first page. The operations of 815 may be performed according to the methods described herein. In some examples, aspects of the operations of 815 may be performed by a page determination component as described with reference to FIG. 7.

At 820, the memory device may update the first selector value associated with the first page to reflect retirement of the first page. The operations of 820 may be performed according to the methods described herein. In some examples, aspects of the operations of 820 may be performed by a selector updating component as described with reference to FIG. 7.

At 825, the memory device may write data to a second page of the set of pages in place of the first page. The operations of 825 may be performed according to the methods described herein. In some examples, aspects of the operations of 825 may be performed by a data reader/writer as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for obtaining, at power up, a first selector value from a first selector associated with a first page of a set of pages of non-volatile memory, determining, based on the first selector value, that the first page contains valid data, determining that the first page is to be retired based on a counter value associated with the first page, updating the first selector value associated with the first page to reflect retirement of the first page, and writing data to a second page of the set of pages in place of the first page.

Some examples of the method 800 and the apparatus described herein may further include operations, features, means, or instructions for updating a second selector value associated with the second page to reflect that the second page contains valid data.

Some examples of the method 800 and the apparatus described herein may further include operations, features, means, or instructions for performing, starting with a page in a first position in an order and according to the order until a page of the set of pages may be found that may have not been retired, a page determination process. In some examples of the method 800 and the apparatus described herein, performing the page determination process may include operations, features, means, or instructions for obtaining a selector value corresponding to the page, and determining if the page may have been retired, based on the selector value.

In some examples of the method 800 and the apparatus described herein, determining that the first page may be to be retired may include operations, features, means, or instructions for determining that the counter value may be above a threshold.

Some examples of the method 800 and the apparatus described herein may further include operations, features, means, or instructions for obtaining a third selector value associated with a third page of the set of pages, and determining, based on the third selector value, that the third page may have been retired, where obtaining the first selector value associated with the first page may be based on determining that the third page may have been retired.

In some examples of the method 800 and the apparatus described herein, the first selector may include a fuse element associated with the first page. In some examples of the method 800 and the apparatus described herein, updating the first selector value to reflect retirement of the first page may include operations, features, means, or instructions for programming the first fuse element associated with the first page.

In some examples of the method 800 and the apparatus described herein, the first selector may include a flag stored in the first page. In some examples of the method 800 and the apparatus described herein, updating the first selector value to reflect retirement of the first page may include operations, features, means, or instructions for setting the first flag stored in the first page. In some examples of the method 800 and the apparatus described herein, the flag may include a set of bits. In some examples of the method 800 and the apparatus described herein, determining that the first page contains valid data may include determining that the first page contains valid data when a threshold percentage of the set of bits of the flag may be set.

In some examples of the method 800 and the apparatus described herein, determining the counter value may include operations, features, means, or instructions for reading the counter value from the first page. In some examples of the method 800 and the apparatus described herein, determining the counter value may include operations, features, means, or instructions for obtaining a second counter value associated with the first page, and incrementing the second counter value to obtain the counter value.

Some examples of the method 800 and the apparatus described herein may further include operations, features, means, or instructions for receiving a reset command. In some examples of the method 800 and the apparatus described herein, writing data to the second page may be based on receiving the reset command.

Some examples of the method 800 and the apparatus described herein may further include operations, features, means, or instructions for obtaining, based on determining that the first page contains valid data, state data from the first page. In some examples of the method 800 and the apparatus described herein, writing data to the second page may include operations, features, means, or instructions for writing the state data to the second page.

FIG. 9 shows a flowchart illustrating a method 900 that supports methods for retiring pages of a memory device in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 905, the memory device may obtain, upon a power-up of a memory device, a first flag value from a flag of a page of a set of pages of non-volatile memory. The operations of 905 may be performed according to the methods described herein. In some examples, aspects of the operations of 905 may be performed by a flag controller as described with reference to FIG. 7.

At 910, the memory device may determine, based on the flag value, that a programming of a fuse element associated with the page has not been completed. The operations of 910 may be performed according to the methods described herein. In some examples, aspects of the operations of 910 may be performed by a fuse programming component as described with reference to FIG. 7.

At 915, the memory device may continue, based on determining that the programming of the fuse element has not been completed, the programming of the fuse element, where the programming of the fuse element indicates that the page is retired. The operations of 915 may be performed according to the methods described herein. In some examples, aspects of the operations of 915 may be performed by a fuse programming component as described with reference to FIG. 7.

At 920, the memory device may determine that the programming of the fuse element is completed. The operations of 920 may be performed according to the methods described herein. In some examples, aspects of the operations of 920 may be performed by a fuse programming component as described with reference to FIG. 7.

At 925, the memory device may write, based on determining that the programming of the fuse element is completed, a second flag value to the flag of the page. The operations of 925 may be performed according to the methods described herein. In some examples, aspects of the operations of 925 may be performed by a flag controller as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for obtaining, upon a power-up of a memory device, a first flag value from a flag of a page of a set of pages of non-volatile memory, determining, based on the flag value, that a programming of a fuse element associated with the page has not been completed, continuing, based on determining that the programming of the fuse element has not been completed, the programming of the fuse element, where the programming of the fuse element indicates that the page is retired, determining that the programming of the fuse element is completed, and writing, based on determining that the programming of the fuse element is completed, a second flag value to the flag of the page.

Some examples of the method 900 and the apparatus described herein may further include operations, features, means, or instructions for obtaining, based on determining that the programming of the fuse element may have not been completed, data from a second page.

In some examples of the method 900 and the apparatus described herein, the flag may include a set of bits. In some examples of the method 900 and the apparatus described herein, determining that the programming of the fuse element associated with the page may have not been completed includes determining that the programming of the fuse element associated with the page may have not been completed when a threshold percentage of the set of bits of the flag may be set.

Some examples of the method 900 and the apparatus described herein may further include operations, features, means, or instructions for obtaining, prior to the power-up of the memory device, a counter value of the page, determining that the page is to be retired, based on the counter value, setting, based on determining that the page is to be retired, the flag of the page to the first flag value, and initiating, based on setting the flag, a page change operation of the memory device. In some examples of the method 900 and the apparatus described herein, the page change operation may include programming the fuse element.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
obtaining, upon a power-up of a memory device, a flag value from a flag of a first page of a plurality of pages of non-volatile memory of the memory device;
determining, based at least in part on the flag value, that programming of a fuse element associated with the first page is not in progress; and
restoring device information from the first page based at least in part on the flag value indicating that the programming of the fuse element is not in progress.

2. The method of claim 1, further comprising:
determining, based at least in part on the flag value, that the device information from the first page is valid, wherein restoring the device information is in response to the determining that the device information is valid.

3. The method of claim 1, further comprising:
updating a counter corresponding to the first page based at least in part on restoring the device information from the first page.

4. The method of claim 3, further comprising:
determining, in response to updating the counter, that the first page is to be retired based at least in part on a value of the counter satisfying a threshold.

5. The method of claim 4, further comprising:
setting, based at least in part on determining that the first page is to be retired, the flag of the first page to a first value.

6. The method of claim 4, further comprising:
initiating, based at least in part on determining that the first page is to be retired, a page change operation of the memory device, wherein the page change operation comprises programming the fuse element.

7. The method of claim 1, wherein the fuse element comprises a fuse and the programming of the fuse element comprises blowing the fuse.

8. The method of claim 1, wherein the first page includes a data portion for storing data associated with the memory device.

9. A memory device, comprising:
a plurality of pages of non-volatile memory; and
processing circuitry configured to cause the memory device to:
obtain, upon a power-up of the memory device, a flag value from a flag of a first page of the plurality of pages of non-volatile memory;
determine, based at least in part on the flag value, that programming of a fuse element associated with the first page is not in progress; and
restore device information from the first page based at least in part on the flag value indicating that the programming of the fuse element is not in progress.

10. The memory device of claim 9, wherein the processing circuitry is further configured to cause the memory device to:
determine, based at least in part on the flag value, that the device information from the first page is valid, wherein restoring the device information is in response to the determination that the device information is valid.

11. The memory device of claim 9, wherein the processing circuitry is further configured to cause the memory device to:
update a counter corresponding to the first page based at least in part on restoration of the device information from the first page.

12. The memory device of claim 11, wherein the processing circuitry is further configured to cause the memory device to:
determine, in response to updating the counter, that the first page is to be retired based at least in part on a value of the counter satisfying a threshold.

13. The memory device of claim 12, wherein the processing circuitry is further configured to cause the memory device to:
set, based at least in part on the determination that the first page is to be retired, the flag of the first page to a first value.

14. The memory device of claim 12, wherein the processing circuitry is further configured to cause the memory device to:
initiate, based at least in part on the determination that the first page is to be retired, a page change operation of the memory device, wherein the page change operation comprises programming the fuse element.

15. The memory device of claim 9, wherein the fuse element comprises a fuse and the programming of the fuse element comprises blowing the fuse.

16. The memory device of claim 9, wherein the first page includes a data portion for storing data associated with the memory device.

17. A non-transitory computer-readable medium storing instructions executable by processing circuitry to cause a memory device to:
obtain, upon a power-up of the memory device, a flag value from a flag of a first page of a plurality of pages of non-volatile memory of the memory device;
determine, based at least in part on the flag value, that programming of a fuse element associated with the first page is not in progress; and
restore device information from the first page based at least in part on the flag value indicating that the programming of the fuse element is not in progress.

18. The non-transitory computer-readable medium of claim 17, wherein the instructions are further executable by the processing circuitry to cause the memory device to:

determine, based at least in part on the flag value, that the device information from the first page is valid, wherein the restoration of the device information is in response to the determination that the device information is valid.

19. The non-transitory computer-readable medium of claim 17, wherein the instructions are further executable by the processing circuitry to cause the memory device to:

update a counter corresponding to the first page based at least in part on the restoration of the device information from the first page.

20. The non-transitory computer-readable medium of claim 19, wherein the instructions are further executable by the processing circuitry to cause the memory device to:

determine, in response to updating the counter, that the first page is to be retired based at least in part on a value of the counter satisfying a threshold.

\* \* \* \* \*